UNITED STATES PATENT OFFICE.

BERTHOLD SINGER, OF CHICAGO, ILLINOIS, ASSIGNOR TO THE PEROLIN COMPANY OF AMERICA, OF CHICAGO, ILLINOIS, A CORPORATION OF ILLINOIS.

SWEEPING COMPOUND.

No. 862,113.　　　　Specification of Letters Patent.　　　Patented July 30, 1907.

Application filed June 23, 1906. Serial No. 323,036.

*To all whom it may concern:*

Be it known that I, BERTHOLD SINGER, a citizen of the United States, residing at Chicago, in the county of Cook and State of Illinois, have invented certain new and useful Improvements in Sweeping Compounds, of which the following is a full, clear, and exact specification.

This invention relates to compositions or compounds designed to be placed upon the floor preparatory to and during sweeping, for collecting or laying the dust, and it has for its primary object to provide a granular form of material for this purpose in which each individual granule or particle shall contain within itself a quantity of dust-absorbing or collecting substance entirely free from oil or other like ingredient liable to damage the surfaces with which it comes into contact, and which dust-collecting substance shall be so held by the said particles as to remain moist practically indefinitely.

With a view to the attainment of these ends, and the accomplishment of certain other objects which will hereinafter appear, the invention consists in the features of novelty which will now be more specifically described, and pointed out in the claims.

In carrying out my invention, I employ a suitable body material comprising small particles or granules, each individual granule of which possesses pores, so as to be capable of absorbing a liquid, as contradistinguished from merely carrying a portion of the liquid on its exterior, and these particles or granules I thoroughly impregnate or saturate with saponified water in proportion sufficient to fully laden each particle without having any free liquid, so that the resultant product will be a granular mass, or mass of detached, separated particles, each containing within itself a quantity of the saponified liquid, and being capable of rolling freely upon the floor, or other surface, and bringing all of its sides into contact with the dust particles, which adhere to the saponified granules by reason of their moist surfaces, which are retained in this moist condition practically indefinitely, and the moisture of the surface thereof replenished by the more liquid form of the saponified substance contained further within the pores of the granule or body-particle. As a suitable porous granule, or comminuted body-substance, I employ saw-dust, comminuted slag, or other like material, but preferably saw-dust, because of its cheapness, its porous nature, and its cleaning properties; and for the saponified material, I employ any suitable soap and water, but preferably a potash or soda soap, and one containing fatty substances, and ammonia. To about one pound of soap, I add 25 pounds of water, in which the soap is dissolved, pref-
erably by the aid of steam or other suitable heat, and after the soap is thoroughly dissolved, making a saponified liquid, and while it is still at a high degree of heat, I add thereto about 12 pounds of saw-dust, or sufficient to entirely absorb all of the liquid and at the same time thoroughly saturate all particles of the saw-dust without leaving the mass mushy or wet. The saw-dust being introduced while the liquid is hot, it readily receives the liquid into its pores, and when it is allowed to cool, the liquid assumes a jelly-like form, which is more or less firm on the outside but of a more liquid consistency further within the pores, so that the exterior portion continually draws moisture from the interior in sufficient quantity to keep the exterior in that semi-moist condition necessary for collecting or laying the particles of dust with which it comes in contact during the sweeping operation. A sweeping compound composed of these ingredients will not only lay or collect the dust without staining or greasing the floor or carpet, but will also cleanse any surface upon which it is rubbed. The efficiency of the material thus described may be considerably enhanced by the addition thereto of a quantity of sand, which serves the two-fold purpose of cutting the particles of saw-dust apart, avoiding the possibility of the granules hanging together *en masse*, and adding weight to the mass to prevent it from flying too freely under the action of the broom, to say nothing of the scouring properties of sand itself. With the proportions before mentioned, 30 pounds of sand may be employed.

The compound may be still further improved by the addition of common salt, or sodium chlorid, in a granular state, which possesses cleaning properties in itself, and has the further advantage of being hygroscopic, and attracting moisture to the mass, as well as drawing the moisture from the interior of the particles of saw-dust to their exteriors and thereby keeping the exteriors moist to the requisite degree.

I claim:

1. A sweeping compound comprising separate non-adhesive granules of porous material and a saponaceous material practically wholly absorbed within the pores thereof.

2. A sweeping compound comprising insoluble porous granules saturated with a saponaceous material, the surface of said granules being almost entirely free from said saponaceous material.

3. A sweeping compound comprising sawdust containing a saponaceous material within the pores thereof, said sawdust being in the form of separate non-adhesive free rolling granules.

4. A sweeping compound comprising sawdust containing within its pores a saponaceous material of jelly like consistency, said sawdust being in the form of separate non-adhesive free rolling granules having their surfaces almost entirely free from said saponaceous material.

5. A sweeping material comprising individual insoluble porous granules saturated with a saponaceous composition in jelly like form.

6. A sweeping material comprising a mass of detached porous granules and a moist saponaceous composition practically wholly absorbed within the pores thereof.

7. A sweeping material comprising a mass of detached non-adherent granules, each of which consists of a single unitary mass of insoluble porous material containing a saponaceous composition practically wholly absorbed within the pores thereof.

8. A sweeping material comprising individual granules of sawdust having a saponaceous material practically wholly absorbed within the pores thereof.

9. A sweeping material comprising a mass of non-adherent granules of sawdust having a saponaceous material in jelly like form practically wholly absorbed within the pores thereof.

10. A sweeping material comprising individual non-adherent granules of sawdust having a moist saponaceous material practically wholly absorbed within the pores thereof.

11. A sweeping material comprising individual non-adherent granules of sawdust having a saponaceous material practically wholly absorbed within the pores thereof, said granules having salt and sand intermingled therewith.

12. A sweeping compound comprising insoluble porous granules and a saponaceous material, the latter being contained practically wholly within the pores of the former and a granular material, all in the form of separate non-adhesive granules.

13. A sweeping compound comprising insoluble porous granules and a solution of soap practically wholly absorbed within the pores thereof, said granules having sand and salt intermingled therewith, all in the form of separate non-adhesive granules.

In testimony whereof I have hereunto affixed my hand this 21st day of June, 1906.

BERTHOLD SINGER.

In the presence of—
L. WALDMAN,
C. HEYMANN.